United States Patent
Patel et al.

(10) Patent No.: US 8,139,720 B2
(45) Date of Patent: *Mar. 20, 2012

(54) METHOD AND APPARATUS FOR PROVIDING A SOFT CLOCK RE-SYNC FOR SUBSCRIBER LINE INTERFACE CARDS

(75) Inventors: Dipak R. Patel, Hatboro, PA (US); Christopher J. Cotignola, Doylestown, PA (US); Thomas C. Gross, Honey Brook, PA (US)

(73) Assignee: General Instrument Corporation, Horsham, PA (US)

( * ) Notice: Subject to any disclaimer, the term of this patent is extended or adjusted under 35 U.S.C. 154(b) by 1313 days.

This patent is subject to a terminal disclaimer.

(21) Appl. No.: 11/740,693

(22) Filed: Apr. 26, 2007

(65) Prior Publication Data
US 2008/0267334 A1    Oct. 30, 2008

(51) Int. Cl.
*H04M 1/24* (2006.01)
*H04M 3/08* (2006.01)
*H04M 3/22* (2006.01)
*H04M 1/00* (2006.01)

(52) U.S. Cl. .................. 379/26.01; 379/413.01
(58) Field of Classification Search .......... 379/1.03, 379/9, 9.06, 15.01, 26.01, 28, 399.02, 413, 379/413.01
See application file for complete search history.

(56) References Cited

U.S. PATENT DOCUMENTS

| 5,058,111 A * | 10/1991 | Kihara et al. ............. 370/420 |
| 7,519,690 B1 * | 4/2009 | Barrow et al. ............. 709/220 |
| 2004/0015617 A1 * | 1/2004 | Sangha et al. ............. 710/10 |

* cited by examiner

*Primary Examiner* — Quoc D Tran

(57) ABSTRACT

A first clock signal is generated by a first circuit and a second clock signal is generated by an auxiliary clock circuit. A switch controls whether the first clock signal or the second clock signal is provided to a subscriber line integrated circuit (SLIC). The SLIC is operable to generate a line voltage within predetermined tolerances on a loop line at a customer premises if the SLIC is receiving the first clock signal or the second clock signal. A resync signal is sent to the SLIC to cause it to resync with the first clock signal without going through a reset operation.

15 Claims, 4 Drawing Sheets

METHOD AND APPARATUS FOR PROVIDING A SOFT CLOCK RE-SYNC FOR SUBSCRIBER LINE INTERFACE CARDS

FIELD OF THE INVENTION

This application relates to a method and apparatus for providing a soft clock resync for a subscriber line interface card (SLIC). More particularly, this application provides a solution which avoids a loss of power at the SLIC from a soft clock resync operation.

BACKGROUND

There are services that a plain old telephone system (POTS) can sustain while executing many sorts of system maintenance. One of these services is the ability to maintain loop line voltage at a customer premises to keep customer premise equipment (CPE) devices operating and unaffected by the system maintenance.

A subscriber line circuit in a plain old telephone system (POTS) is a circuit connecting a subscriber line at a customer premises to the central office. The subscriber line is traditionally a twisted-pair loop for carrying analog voice. Today, the subscriber line is also used for digital services as well, such as provided via cable, DSL or satellite.

Customer premise equipment (CPE) devices, such as phones, facsimiles, home security systems, answering machines, etc., connected to the subscriber line at the customer premises may depend on the line voltage of the subscriber line for proper operation. For example, an alarm system at a customer premises monitors the line voltage. If the line voltage falls below a threshold for a predetermined period of time, the alarm system assumes the subscriber line has been cut, and sends an alarm message to a remote monitoring station. In addition, the alarm system activates a loud, local alarm siren, which can wake everyone in the middle of the night for a false alarm if the line voltage falls below a threshold in the middle of the night.

The POTS has the ability to maintain line voltage to keep the CPE devices operating and unaffected when system maintenance is performed, such as software downloads and upgrades, system reboots, and system re-configurations. However, the ability to maintain line voltage during system maintenance may not be supported by a multimedia terminal adaptor (MTA) for a voice-over-internet-protocol (VoIP) network. VoIP is a digital telephone service that may be provided through a broadband connection, such as a coaxial cable from a cable service provider, and typically replaces conventional POTS service provided by a telephone company over a twisted pair network. VoIP may be deployed at the customer premises via the MTA. The MTA interfaces with an IP network and is operable to adapt VoIP data for use by CPE devices connected to the subscriber line. The MTA may be embedded in a modem, such as a cable modem or DSL modem, as an embedded MTA or may be provided as a standalone device connected to the modem.

Maintenance is periodically performed on the modem or MTA, or the VoIP service provider's network, which may include software downloads, correcting a lock-up situation or other maintenance. During a maintenance period, a network clock signal generally provided by the service provider's network during normal service is generally not provided to the modem or MTA, hence preventing the modem or MTA from being able to generate a line voltage for the SLIC. Once the maintenance is completed, the modem or MTA must be reset to lock onto the network clock signal, and also possibly to run a new program installed during the maintenance. The line voltage on the subscriber line may drop because the MTA does not include the ability to maintain the line voltage when during the maintenance nor during a reset/resync operation to the network clock. This may result in failure or improper operation of a CPE device. For example, if the line voltage falls below a threshold for a predetermined period of time, the alarm system assumes the subscriber line has been cut, and sends a false alarm to the remote monitoring station. Furthermore, scheduled system maintenance is typically performed during non-peak hours, such as late at night. Thus, a false alarm caused by the scheduled maintenance may appear real, because home robberies mostly occur during the late night hours.

A specialized SLIC device may be able to generate a line voltage without the network clock; however, the SLIC itself must also reset to synchronize onto the new network clock. Resetting of the SLIC also generally results in a loss of line voltage. The current generation of VoIP Subscriber Line Interface Cards (SLICs), is not capable of re-synchronizing to a new input clock. These current generation devices must be fully reset, then taken out of reset, so that the new input clock can be processed. This causes a major disruption to the SLIC's main purpose, which is generating line voltage for telephony devices.

SUMMARY

The invention enables a reset operation in an MTA device which avoids loss of line voltage by minimal loss of a clock provided to a SLIC. After a reset operation occurs in the MTA, a new clock, based on a network clock is provided to the SLIC, and the SLIC is switched to the new clock without being reset. The SLIC preferably contains a phase lock loop which locks onto the new clock once it is switched to the SLIC.

An apparatus in accordance with the invention may comprise: a microprocessor providing a first clock signal; an auxiliary clock circuit generating a second clock signal; a subscriber line integrated circuit (SLIC) generating a line voltage on a loop line if the SLIC is receiving the first clock signal or the second clock signal; and a switch controlling whether the SLIC receives the first clock signal or the second clock signal based on instructions from the microprocessor, wherein when the microprocessor instructs the switch to provide the first clock signal to the SLIC, after providing the second clock signal to the SLIC, the SLIC resynchronizes with the first clock signal without being reset. In the apparatus, the microprocessor may instruct the switch to provide the second clock signal to the SLIC when the microprocessor detects a soft reset. In the apparatus, the microprocessor may instruct the switch to provide the first clock signal to the SLIC when the microprocessor completes a reset operation.

The SLIC may contain a phase lock loop which synchronizes a SLIC clock based on a received first clock signal or second clock signal. The switch may be contained in the SLIC and the microprocessor provides instructions to switch by a dedicated connection to the SLIC.

In accordance with the invention, a method of resynchronizing a clock in a SLIC may comprise the steps of: detecting that a microprocessor has completed a soft reset operation; providing a clock from the microprocessor to the SLIC after completing the soft reset operation; and sending instructions to a switch associated with the SLIC to provide the clock from the microprocessor to the SLIC, wherein the SLIC synchronizes with the first clock signal without being reset. In the method, an auxiliary clock may be provided to the SLIC when the microprocessor detects a soft reset. In the method, the clock from the microprocessor may be provided to the SLIC when the microprocessor completes a reset operation.

In accordance with the invention, a computer readable medium may carry instructions to cause a computer resynchronize a clock in a SLIC, the instructions comprising instructions to perform the steps of: detecting that a microprocessor has completed a soft reset operation; providing a clock from the microprocessor to the SLIC after completing the soft reset operation; and sending instructions to a switch associated with the SLIC to provide the clock from the microprocessor to the SLIC, wherein the SLIC synchronizes with the first clock signal without being reset. In accordance with the instructions on the computer readable medium an auxiliary clock may be provided to the SLIC when the microprocessor detects a soft reset. In accordance with the instructions on the computer readable medium the clock from the microprocessor may be provided to the SLIC when the microprocessor completes a reset operation.

BRIEF DESCRIPTION OF THE DRAWINGS

Embodiments are illustrated by way of example and not limited in the following Figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
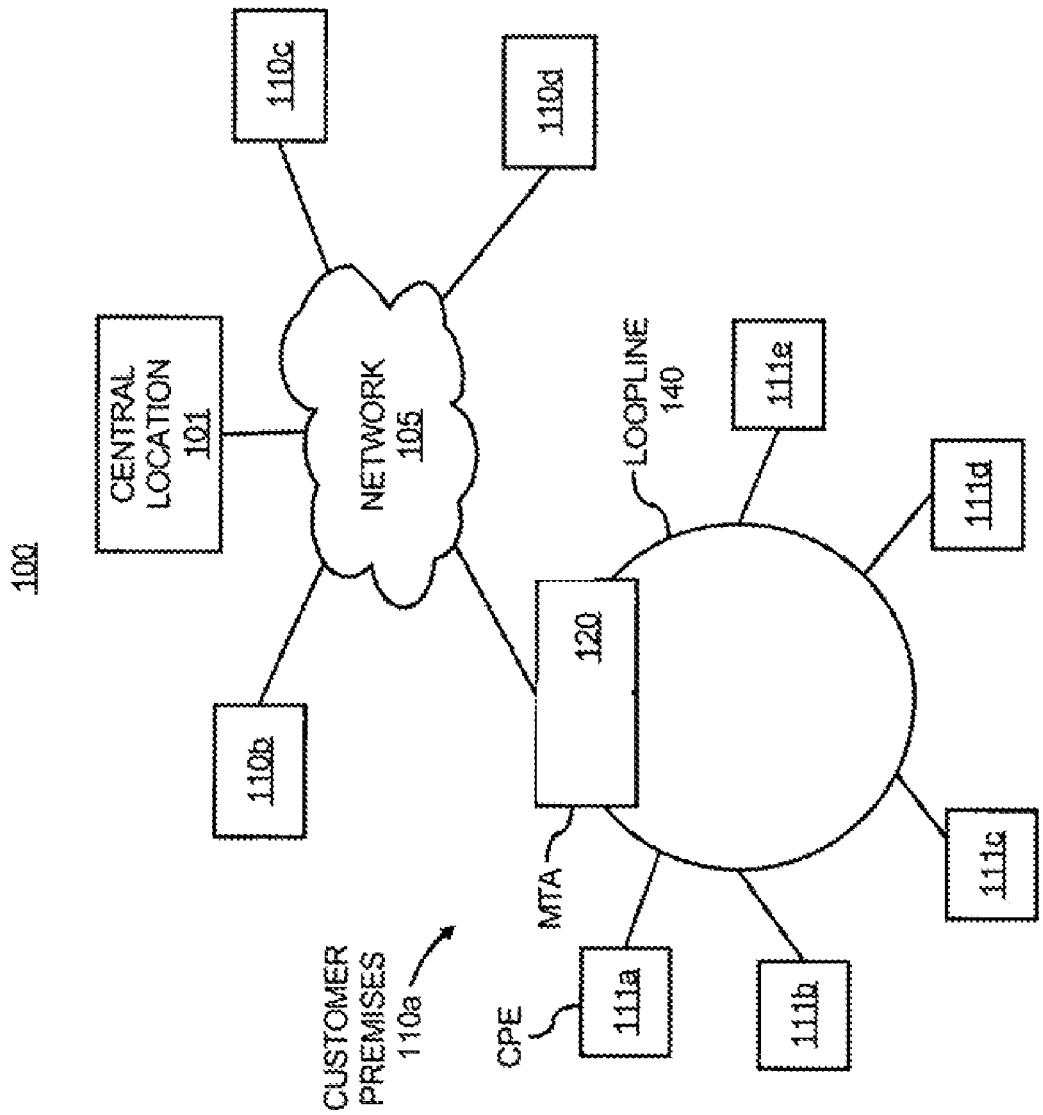
FIG. 1 illustrates a system, according to an embodiment.

FIG. 1 illustrates a system 100, according to an embodiment. The system 100 includes a central location 101 transmitting digital content to a plurality of customer premises 110a-n via a network 105. The central location 101 may include a cable head-end or a central office connected to a cable head-end providing communication services to the customer premises 110a-n. The network 105 may include an IP network for providing digital communication services. The digital communication services may include a high-speed Internet connection, cable television, VoIP, and satellite services, etc.

The customer premises 110a-n may each include a modem and an MTA providing VoIP services. For example, the customer premise 110a is shown with a modem 120 having an MTA 121. Although not shown, one or more of the remaining customer premises 110b-n may include a modem and an MTA. The MTA 121 may be embedded in the modem 120 or provided as a standalone device connected to the modem 120. In one embodiment, the modem 120 is a cable modem. However, the modem 120 may include a DSL modem, satellite modem, or other types of modems. The modem 120 is operable to receive digital data from the central location 101 for use at the customer premises 110a. The digital data may include digital audio, digital video, data downloaded from the Internet, etc. The MTA 120 provides VoIP services for the customer premises 110a, as described in further detail below.

One or more CPE devices 111a-e may be connected to the twisted pair loop, referred to as the loop line 140 at the customer premises 110a. The loop line 140, for example, is a twisted pair copper subscriber line at the customer premises 110a. Examples of CPE devices include phones, home security systems, answering machines, facsimiles, and others. According to an embodiment, a SLIC 123 (see FIG. 2) associated with the MTA 120 is operable to maintain the line voltage on the loop line 140 during system maintenance, which allows the CPE devices 111a-e that utilize the line voltage to maintain normal operation during system maintenance.

Figure 2:
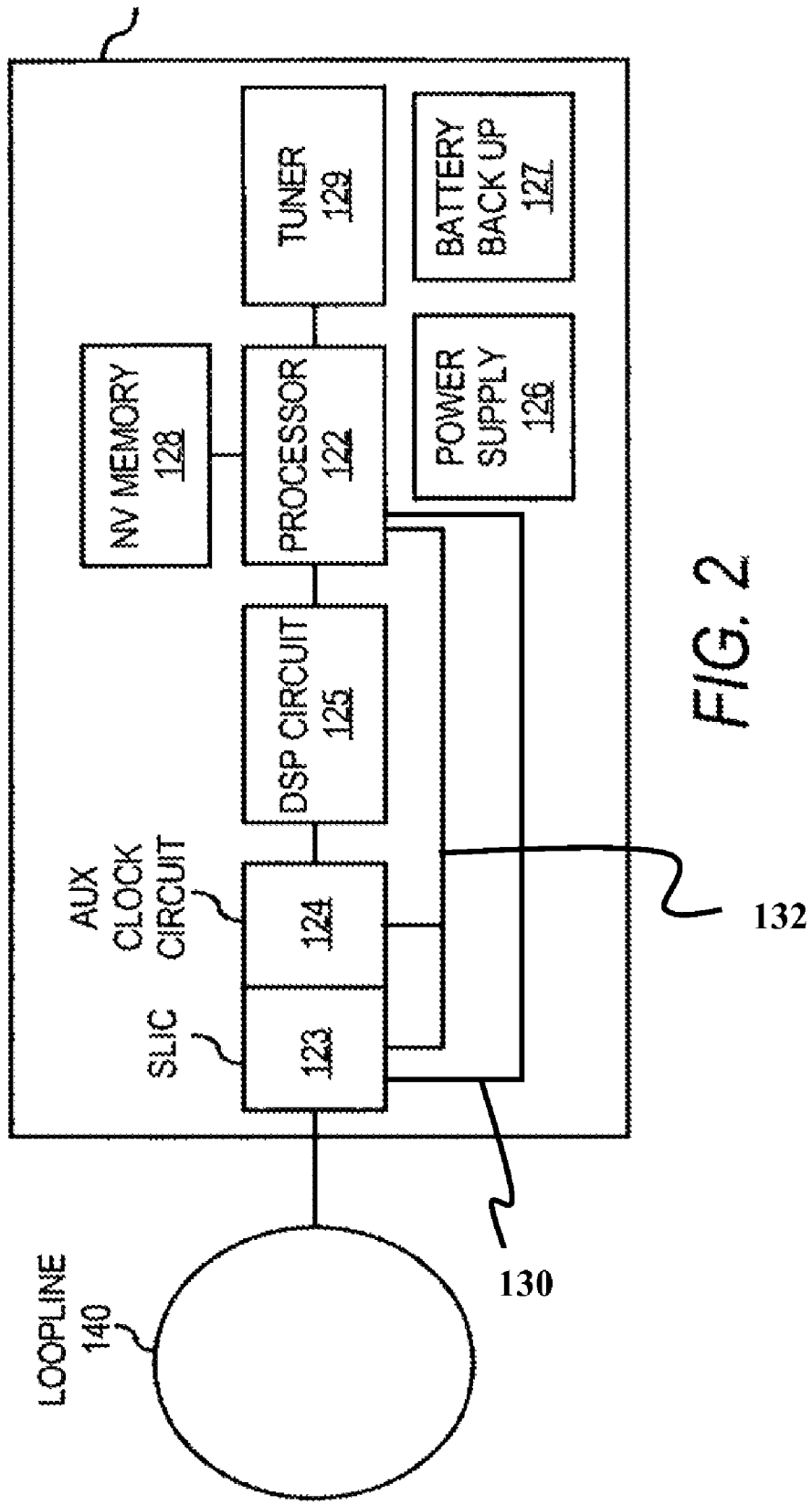
FIG. 2 illustrates a block diagram of an MTA, according to an embodiment.

FIG. 2 illustrates a block diagram of the MTA 120, according to an embodiment. The MTA 120 includes a tuner 129, a digital signal processing (DSP) circuit 125, a processor 122, a subscriber line integrated circuit (SLIC) 123, an auxiliary clock circuit 124, nonvolatile memory 128, a power supply 126, and a battery-backup 127. The MTA 120 includes a power supply 126 and may include a battery-backup 127 operable to supply power to the components of the MTA 120.

The MTA 120 receives the digital data sent via the network 105 shown in FIG. 1 and demodulates and formats the data for transmission on the loop line 140 and for use by the customer premises equipment. For example, if the system 100 represents a cable network architecture, the processor 122 tunes the tuner 129 to receive high frequency cable (HFC) signals on predetermined channels carrying digital data, and the signals are demodulated as is known in the art. The DSP circuit 125 converts the received signals to frames for each channel. The processor 122 may be a cable modem processor or other type of processor depending on the type of MTA or a modem of the MTA.

The SLIC 123 preferably emulates the functions of a telephony central office, as is known in the art, for providing VoIP services. The SLIC 123 may be provided in a MTA 120 as shown in FIG. 2A. One function performed by the SLIC 123 is generating a line voltage on the loop line 140, which is typically provided by a telephone central office to a customer premises, such that the customer premises equipment can function properly. For example, on-hook and off-hook voltages, also referred to as tip and ring voltages, are generated by the SLIC 123. The SLIC 123 generates a line voltage, which may include a tip voltage or a ring voltage, within predetermined tolerances.

Conventionally, the line voltage of the loop line 140 may fall outside of a predetermined tolerance during a soft reset because a typical SLIC is unable to generate the proper line voltage during the soft reset due to loss of a clock from the network. A soft reset is when power is maintained to a MTA, but a processor for the MTA, such as processor 122, is reset. During a reboot or another type of reset, the power is maintained to the processor 122. The soft reset is different than a power cycle. A power cycle may be performed when power is not maintained. For example, a power cycle is performed during power up, after the MTA 120 is off for an extended period. A soft reset may be caused by a software download to the MTA 120 or other factors. During a soft reset, when power is maintained to the MTA 120, firmware and/or hardware executes a reset of the processor 122 and other components of the MTA 120.

In the preferred implementation of the present invention, the SLIC 123 uses a PCM clock signal from processor 122 to generate the line voltage for the loop line 140. The PCM clock is generated by processor 122 from a reference network clock provided by network 105. More precisely, the PCM clock is synchronized with the network clock. SLIC 123 may also receive an input frame sync clock from DSP 125, which is used to process voice data for VoIP communications. During a soft reset, the network clock is not received or processed by processor 122, and hence a PCM clock signal may not be provided to the SLIC 123 from the processor 122.

In commonly assigned application U.S. application Ser. No. 11/411,696, filed Apr. 26, 2006, titled MAINTAINING LINE VOLTAGE DURING RESET, herein incorporated by reference in its entirety, an auxiliary clock circuit is disclosed to generate a clock signal for the SLIC when a soft reset occurs, and hence provide a line voltage during a reset operation. However, under this solution the SLIC must still go through a reset process once the maintenance is completed in order to resynchronize with the new PCM clock after the reset operation. This still often causes a loss of voltage on loop line 140 for a short period of time.

With reference to FIG. 2, the present invention enables resynchronization of the SLIC with a new PCM clock without a reset operation. As illustrated in FIG. 2, processor 122 has a direct connection 130 to SLIC 123 through which processor 122 provides resync instructions to SLIC 123. Processor 122 also provides PCM clock to SLIC 123 through PCM clock line 132. The direct connection 130 may be provided through a general purpose input output (GPIO) contained on the microprocessor 122, and may connect to an input pin on the SLIC 123. In the preferred implementation, the resync instructions instruct SLIC 123 to resync onto the PCM clock without undergoing a reset operation.

In one embodiment, the auxiliary clock circuit 124 generates a clock signal for the SLIC 123 only when needed, instead of continuously generating a clock signal. Thus, power is conserved. This is especially beneficial if the battery-backup 127 is supplying power to the modem 120 instead of the main power supply 126, so as not to consume the limited amount of power available via the battery-backup 127. It will be apparent to one of ordinary skill in the art that in other embodiments, the auxiliary clock circuit 124 may be designed to generate a clock signal continuously or even when not needed, however, only a clock signal from a single source is provided to the SLIC 123 at any given time.

Figure 3:
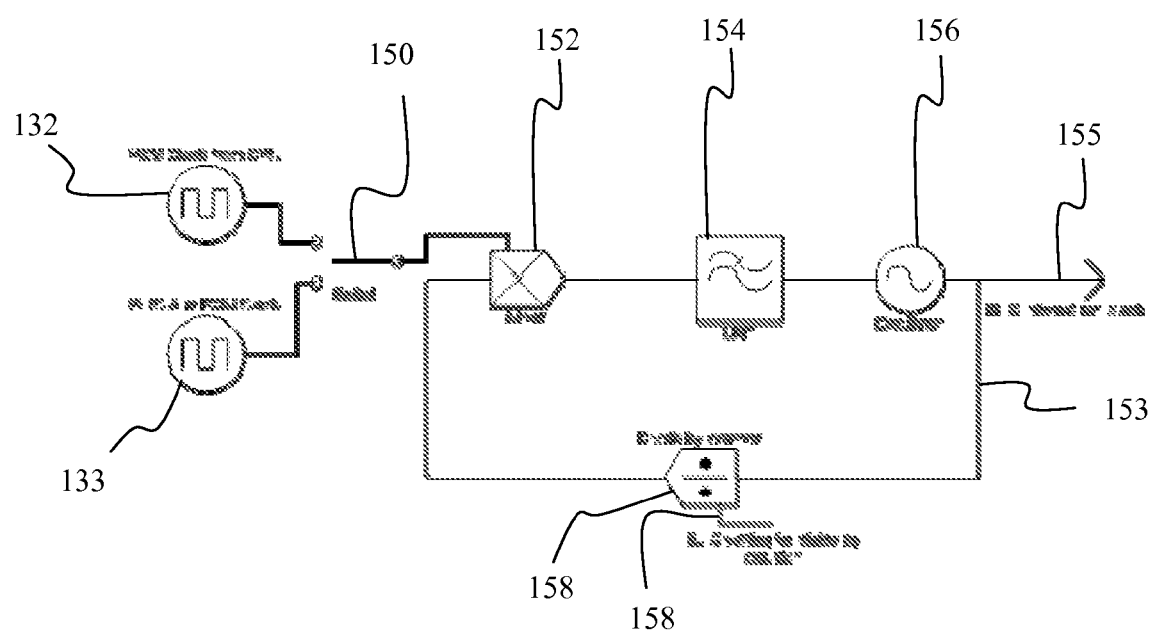
FIG. 3 illustrates a schematic diagram of a SLIC resync circuit, according to an embodiment.

FIG. 3 illustrates a conceptual schematic of an exemplary SLIC in accordance with the principles of the invention. As illustrated in FIG. 3, SLIC 123 preferably contains a switch 150 which switches between the PCM clock on line 132 from processor 122, and an auxiliary PCM clock 133 based on instructions from microprocessor 122 on line 130. The auxiliary PCM clock 133 may be internal to the SLIC, or may be externally generated from a clock source. The SLIC 123 preferably contains a phase lock loop (PLL) which includes mixer 152, low pass filter 154, oscillator 156, and a feedback line 153. Feedback line 153 feeds an internal SLIC clock 155 output by oscillator back to mixer 152, where it is combined with the input clock from switch 150. A divide by counter 158 may also be contained in the feedback loop, illustrated in feedback line 153, which may further divide the internal SLIC clock into specific channels or frequencies. The divide by counter 158 may contain a SLIC setting to specify the clock or channel to generate.

Those of skill in the art will appreciate that the PLL in the circuit in FIG. 3 will phase lock onto the clock input via switch 150, causing the internal SLIC clock 155 to be synchronized with the input clock. Accordingly, when switch 150 is instructed to select auxiliary PCM clock 133, the SLIC clock 155 is synchronized with auxiliary PCM clock 133. When switch 150 is instructed to select PCM clock 132 from processor 122, the SLIC clock 155 is synchronized with auxiliary PCM clock 132. Thus, SLIC 123 is able to continuously generate a line voltage using either auxiliary clock 133 or PCM clock 132. Further, when a new PCM clock 132 is generated, such as after a software install operation in processor 122, new PCM clock 132 may be selected by switch 150 which causes SLIC 123 to resync to the new PCM clock 132 without going through a reset operation itself.

Figure 4:
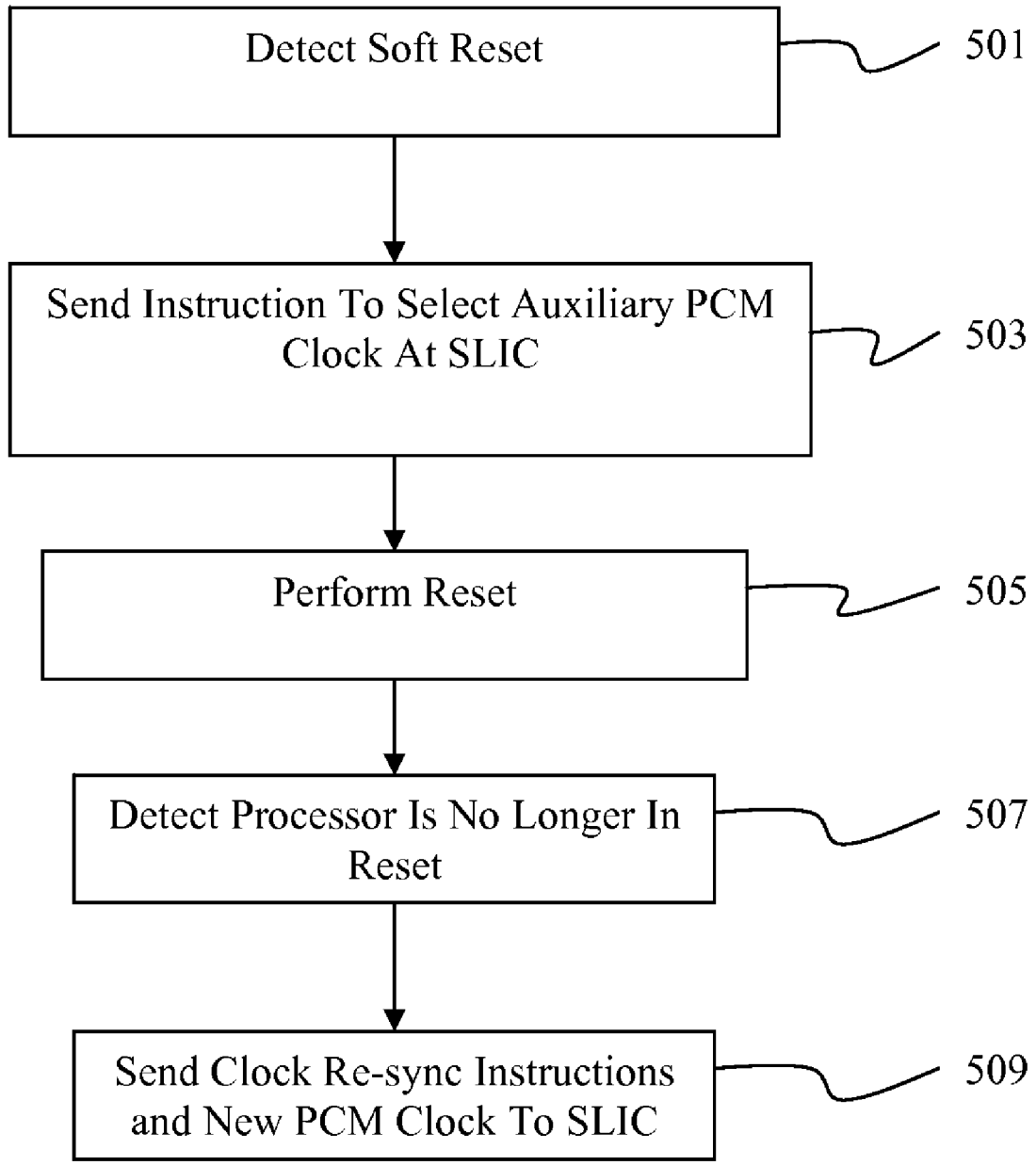
FIG. 4 illustrates a flow chart of a method for resynchronizing a clock of a SLIC, according to an embodiment.

FIG. 4 illustrates an exemplary process in accordance with the principles of the invention. As illustrated in FIG. 5, a soft reset is detected at step 501, which may include a software update for processor 122 or other maintenance routines. The MTA 120 is placed in a reset mode, microprocessor 122 instructs SLIC 123 to switch to an auxiliary clock, step S503, such as through resync line 130, and microprocessor performs the reset operation, step S505. SLIC 123 preferably uses the auxiliary clock to generate an internal SLIC clock and to generate a line voltage for loopline 140. Once processor 122 is no longer in reset mode, step S507, a new PCM clock is generated by processor 122 and a resync signal is sent to SLIC 123 via resync line 130, step S509, which instructs switch 150 to select the new PCM clock as the input clock for the SLIC. Preferably, the SLIC will resync with the new PCM clock without being reset itself, avoiding a loss of line voltage on loop line 140.

While FIG. 2 illustrates a MTA containing a modem, however, those of skill in the art will appreciate that a standalone MTA which is connected to an external modem may also be used. It will be further apparent to one of ordinary skill in the art that the MTA shown in FIG. 2 may include more components and more connections between components than shown. Simplified block diagrams are shown to illustrate the embodiments.

One or more of the steps of the process described in and in conjunction with FIG. 2 and other steps described herein may be implemented as software embedded or stored on a computer readable medium, such as the NV memory 128 shown in FIG. 2 or other storage. Steps of detecting a soft reset, generating a signal indicating a soft reset for switching to a clock signal generated by the clock circuit 124 shown in FIG. 2, and steps for initialization the SLIC 123 are some examples of steps that may be performed or initiated by software. The steps may be embodied by a computer program, which may exist in a variety of forms both active and inactive. For example, they may exist as software program(s) comprised of program instructions in source code, object code, executable code or other formats for performing some of the steps when executed. Modules include software, such as programs, subroutines, objects, etc. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

The invention enables a reset operation in an MTA device with minimal loss of line voltage by minimal loss of a clock provided to a SLIC. After a reset operation occurs in the MTA, a new clock, based on a network clock is provided to the SLIC, and the SLIC is switched to the new clock without being reset. The SLIC preferably contains a phase lock loop which locks onto the new clock once it is switched to the SLIC.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. An apparatus comprising:
    a microprocessor providing a first clock signal;
    an auxiliary clock circuit generating a second clock signal;
    a subscriber line integrated circuit (SLIC) generating a line voltage on a loop line if the SLIC is receiving the first clock signal or the second clock signal; and
    a switch controlling whether the SLIC receives the first clock signal or the second clock signal based on instructions from the microprocessor,
    wherein when the microprocessor instructs the switch to provide the first clock signal to the SLIC, after providing the second clock signal to the SLIC, the SLIC resynchronizes with the first clock signal without being reset.

2. The apparatus of claim 1, wherein the microprocessor instructs the switch to provide the second clock signal to the SLIC when the microprocessor detects a soft reset.

3. The apparatus of claim 2, wherein the microprocessor instruct the switch to provide the first clock signal to the SLIC when the microprocessor completes a reset operation.

4. The apparatus of claim 1, wherein the SLIC contains a phase lock loop which synchronizes a SLIC clock based on a received first clock signal or second clock signal.

5. The apparatus of claim 1, wherein the switch is contained in the SLIC and the microprocessor provides instructions to switch by a dedicated connection to the SLIC.

6. A method of resynchronizing a clock in a SLIC comprising the steps of:
    detecting that a microprocessor has completed a soft reset operation;
    providing a clock signal from the microprocessor to the SLIC after completing the soft reset operation; and
    sending instructions to a switch associated with the SLIC to provide the clock signal from the microprocessor to the SLIC,
    wherein the SLIC synchronizes with the clock signal from the microprocessor without being reset.

7. The method of claim 6, wherein an auxiliary clock is provided to the SLIC when the microprocessor detects a soft reset.

8. The method of claim 7, wherein the clock signal from the microprocessor is provided to the SLIC when the microprocessor completes a reset operation.

9. The method of claim 6, wherein the SLIC contains a phase lock loop which synchronizes a SLIC clock based on received clock signal from the microprocessor or the second clock signal.

10. The method of claim 6, wherein the switch is contained in the SLIC and the microprocessor provides instructions to switch by a dedicated connection to the SLIC.

11. A non-transitory computer readable medium carrying instructions to cause a computer resynchronize a clock in a SLIC, the instructions comprising instructions to perform the steps of:
    detecting that a microprocessor has completed a soft reset operation;
    providing a clock signal from the microprocessor to the SLIC after completing the soft reset operation; and
    sending instructions to a switch associated with the SLIC to provide the clock signal from the microprocessor to the SLIC,
    wherein the SLIC synchronizes with the clock from the microprocessor without being reset.

12. The non-transitory computer readable medium of claim 11, wherein an auxiliary clock signal is provided to the SLIC when the microprocessor detects a soft reset.

13. The non-transitory computer readable medium of claim 12, wherein the clock signal from the microprocessor is provided to the SLIC when the microprocessor completes a reset operation.

14. The non-transitory computer readable medium of claim 11, wherein the SLIC contains a phase lock loop which synchronizes a SLIC clock based on a received first clock signal or a second clock signal.

15. The non-transitory computer readable medium of claim 11, wherein the switch is contained in the SLIC and the microprocessor provides instructions to switch by a dedicated connection to the SLIC.

* * * * *